United States Patent
Yao

(10) Patent No.: US 9,470,362 B2
(45) Date of Patent: Oct. 18, 2016

(54) AUTOMATIC OIL INJECTOR

(71) Applicant: Hsiang-Yi Yao, Changhua (TW)

(72) Inventor: Hsiang-Yi Yao, Changhua (TW)

(73) Assignee: TEKTRO TECHNOLOGY CORP, Changhua (TW)

( * ) Notice: Subject to any disclaimer, the term of this patent is extended or adjusted under 35 U.S.C. 154(b) by 293 days.

(21) Appl. No.: 14/259,159

(22) Filed: Apr. 23, 2014

(65) Prior Publication Data

US 2014/0224586 A1    Aug. 14, 2014

(30) Foreign Application Priority Data

Nov. 5, 2013   (TW) .............................. 102220563 U

(51) Int. Cl.
| | | |
|---|---|---|
| *F16N 13/00* | (2006.01) | |
| *F16N 5/00* | (2006.01) | |
| *F16N 19/00* | (2006.01) | |
| *F16N 13/06* | (2006.01) | |

(52) U.S. Cl.
CPC ................ *F16N 13/00* (2013.01); *F16N 5/00* (2013.01); *F16N 19/003* (2013.01); *F16N 2013/063* (2013.01)

(58) Field of Classification Search
CPC ........ F16N 13/00; F16N 5/00; F16N 19/003; F16N 2013/063
USPC ......................................................... 184/6.4
See application file for complete search history.

(56) References Cited

U.S. PATENT DOCUMENTS

| | | | | |
|---|---|---|---|---|
| 1,433,613 A * | 10/1922 | Harne | .................. | F01M 11/061 184/103.2 |
| 1,800,333 A * | 4/1931 | Wertz | ....................... | F16N 5/00 222/318 |
| 2,431,534 A * | 11/1947 | Benner | ................... | F16N 13/10 222/318 |
| 2,541,352 A * | 2/1951 | Ginter | ....................... | F16N 5/00 222/113 |
| 2,543,784 A * | 3/1951 | Kyle | ........................ | F16N 29/04 184/6.4 |
| 2,620,940 A * | 12/1952 | Ginter | .................... | B67D 7/845 220/4.01 |
| 2,624,491 A * | 1/1953 | Bills | ....................... | F04B 17/046 222/146.1 |
| 2,634,885 A * | 4/1953 | North | ........................ | F16N 5/00 222/333 |
| 2,777,610 A * | 1/1957 | Fox | ............................ | F16N 5/00 222/130 |
| 2,858,964 A * | 11/1958 | North | ........................ | F16N 5/00 222/239 |
| 2,865,540 A * | 12/1958 | Gray | .......................... | F16N 5/00 222/341 |
| 3,033,311 A * | 5/1962 | Edgar | ................... | F01M 11/045 184/1.5 |
| 3,103,947 A * | 9/1963 | Mueller | .............. | F01M 11/0408 137/351 |
| 4,378,026 A * | 3/1983 | Bauer | ................... | F01M 11/045 137/205 |
| 5,341,900 A * | 8/1994 | Hikes | ....................... | F16H 57/04 184/103.2 |
| 5,906,381 A * | 5/1999 | Hovatter | ................ | B25H 3/028 280/47.18 |
| 6,755,207 B1 * | 6/2004 | Curtis | ........................ | F04F 3/00 137/205 |
| 8,517,146 B2 * | 8/2013 | Drew | ....................... | F01M 11/04 138/89 |
| 8,991,558 B1 * | 3/2015 | Murphy, Sr. | ............ | G01F 23/70 184/108 |

* cited by examiner

*Primary Examiner* — Michael Riegelman
(74) *Attorney, Agent, or Firm* — Yuwen Guo

(57) ABSTRACT

An automatic oil injector is provided with a container; a cover detachably covering the container; a suction pipe passing through and fastening the cover, and one end of the suction pipe accommodated at the bottom of the container, and the other end of the suction pipe exposed outside the cover; an inlet hole passing through the cover, and one end of the inlet hole accommodated inside the container and the other end of the inlet hole disposed with a folding cover; a pump; the end of the suction pipe exposed outside the cover fluidly connected with an inlet port of the pump; an oil injecting pipe, one end of the oil injecting pipe fluidly connected with an outlet port of the pump; a control switch electrically connecting to the pump; an liquid level indicator disposed outside the container; and an accommodating groove connected to the container.

4 Claims, 6 Drawing Sheets

AUTOMATIC OIL INJECTOR

FIELD OF THE INVENTION

The present invention relates to a bicycle, and more particularly to an automatic oil injector for an oil tube of a bicycle.

BACKGROUND OF THE INVENTION

In general, oil injecting bottle 200 (shown as in FIG. 1) or injection syringe 300 (shown as in FIG. 2) is usually used while repairing to replace oil.

When using the oil injecting bottle 200 (shown as in FIG. 1), an oil injecting tube 210 is fluidly connected to the oil injecting hole of the bicycle, and an oil bottle 220 filled oil is squeezed to inject oil through the oil injecting hole of the bicycle for replacing oil and repairing.

When using injecting syringe 300 (shown as in FIG. 2), an oil injecting tube 310 is fluidly connected to the oil injecting hole of the bicycle, and a push rod 320 is pressed to inject oil received in a container 330 through the oil injecting hole of the bicycle for replacing oil and repairing.

Although it is convenient to replace oil, for operators, the output quantity of oil is not easy to be controlled by hand pressing and the quality of injecting oil is not very well.

SUMMARY OF THE INVENTION

Therefore, an automatic oil injector is provided. A pump is controlled by a control switch for injecting oil into a container to process the operation of repair. It is not only easy to control the quantity of oil, but also easy to carry. And it has the efficiency of small volume, simplified structure, and preventing from influencing oil injecting quality operated by operators.

An automatic oil injector is disclosed and comprises a container, having an open structure thereabove; a cover, detachably covering the container; a suction pipe, passing through and fastening the cover, wherein one end of the suction pipe is accommodated in the container so as to contact an inner bottom surface of the container and the other end of the suction pipe is exposed externally to the cover and the container; an inlet hole, passing through the cover, wherein one end of the inlet hole is fluidly communicated with the container and the other end of the inlet hole is disposing a folding cover; a pump, having an inlet port and an outlet port, the end of the suction pipe exposed externally to the cover and the container is fluidly connected with the inlet port of the pump; an oil injecting pipe, one end of the oil injecting pipe is fluidly connected with the outlet port of the pump; a control switch, electrically connecting to the pump for controlling the operation of the pump; an liquid level indicator, disposed outside the container for indicating the level of oil accommodated in the container; and an accommodating groove, connected to the container for accommodating the oil injecting pipe.

In some embodiments, the automatic oil injector further comprises a coil winding assembly which is upwardly extending from a top surface of the container for receiving an electric wire of the pump to be winded around.

Preferably, the end of the oil injecting pipe away from the outlet port of the pump is fluidly connected to an oil hole of a bicycle with at least one quick release structure.

In some embodiments, the automatic oil injector further comprises a feedback hole passing through the cover and spaced apart from the inlet hole to make a brake oil feedback to the container.

Preferably, two filters are located in the container and respectively cover the inlet hole and the feedback hole.

In some embodiments, the automatic oil injector further comprises a handle which is connected with the container.

Preferably, the oil injecting pipe is fluidly communicated with a check valve for preventing the oil from being flowed back and preventing the air inflow from being kept in of the oil injecting pipe in vacuum condition while stopping injecting oil.

DESCRIPTION OF THE PREFERRED EMBODIMENT

Figure 1:
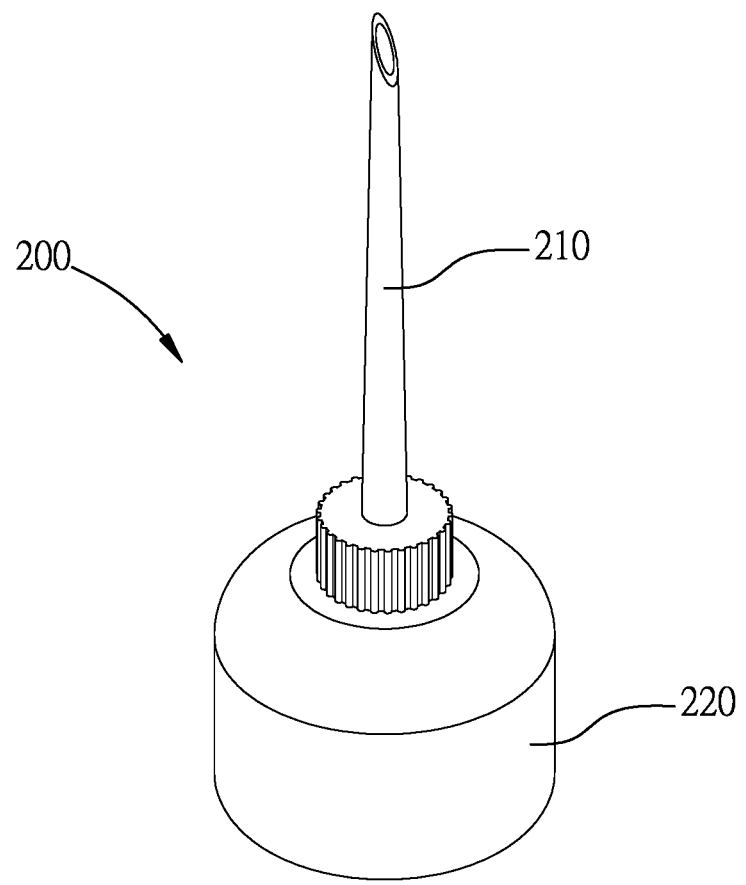
FIG. 1 is an exploded view of a conventional oil injector.
Figure 2:
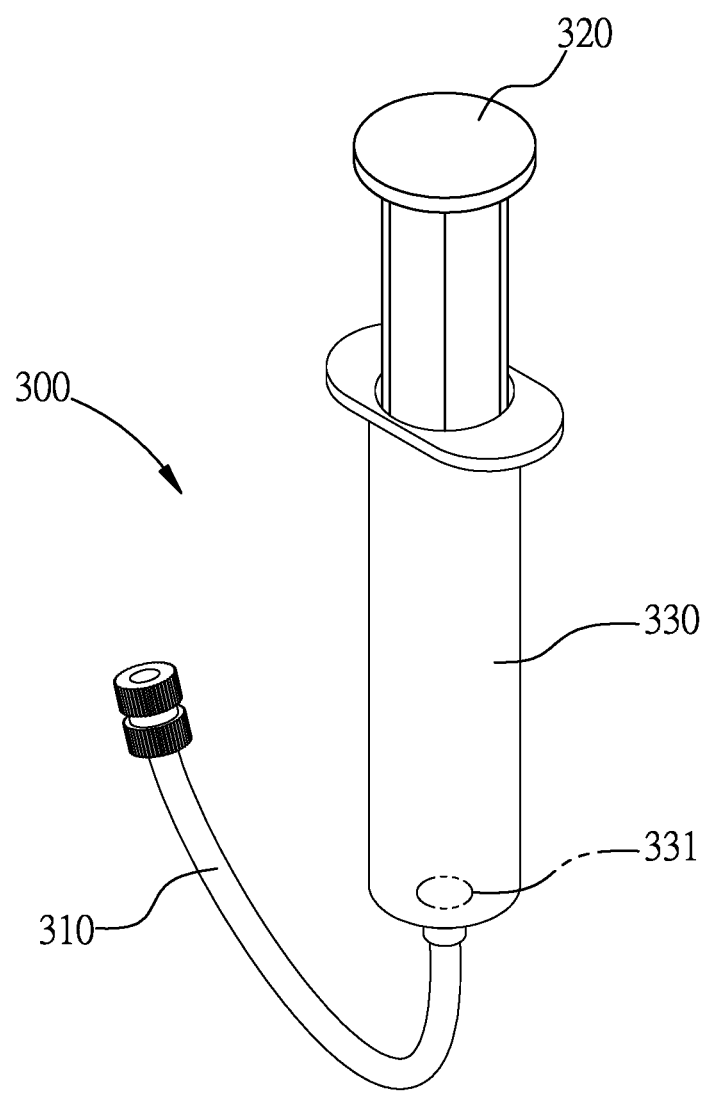
FIG. 2 is an outside view of the conventional oil injector.
Figure 3:
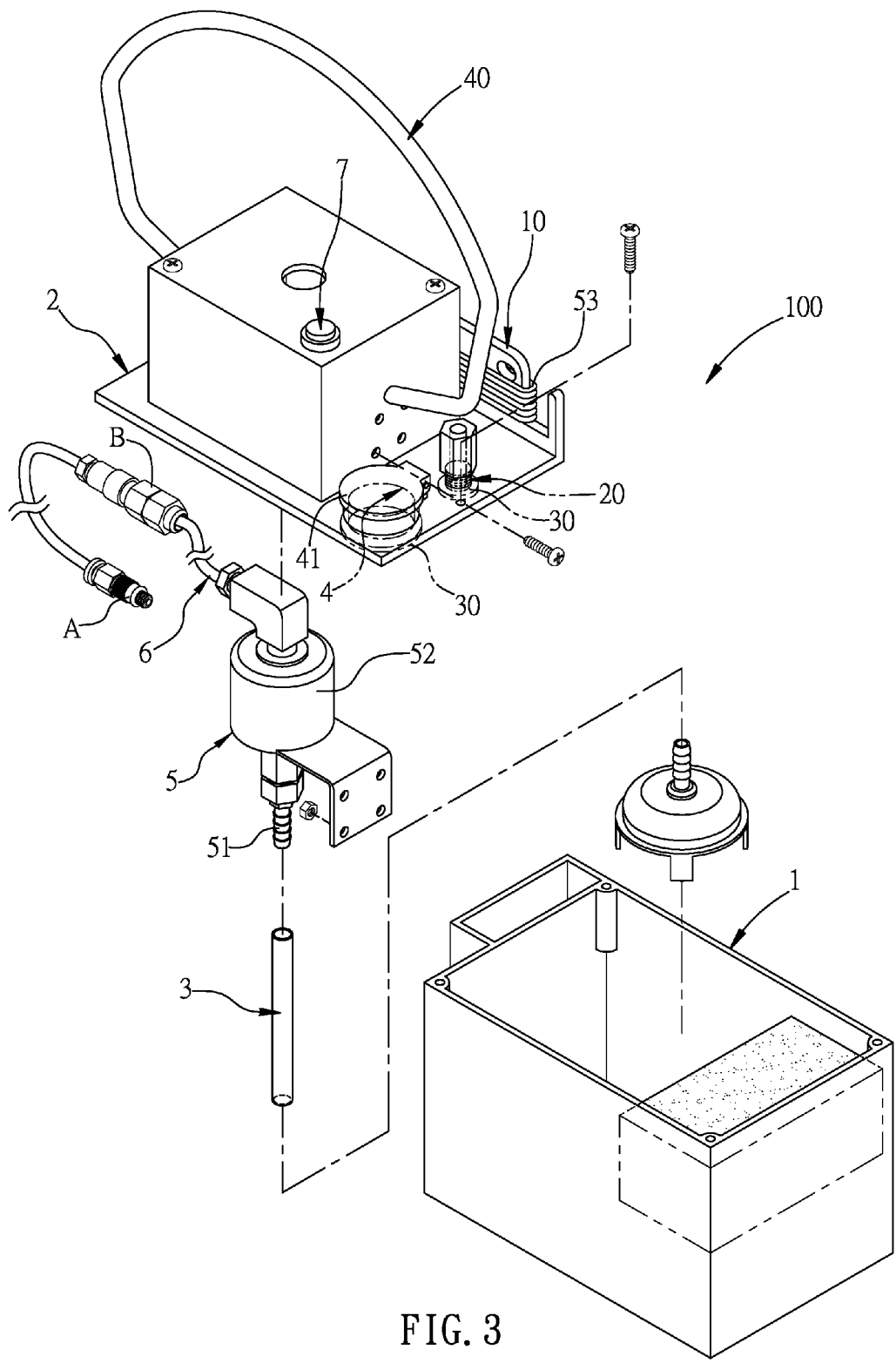
FIG. 3 is an exploded view of an automatic oil injector according to present invention.
Figure 4:
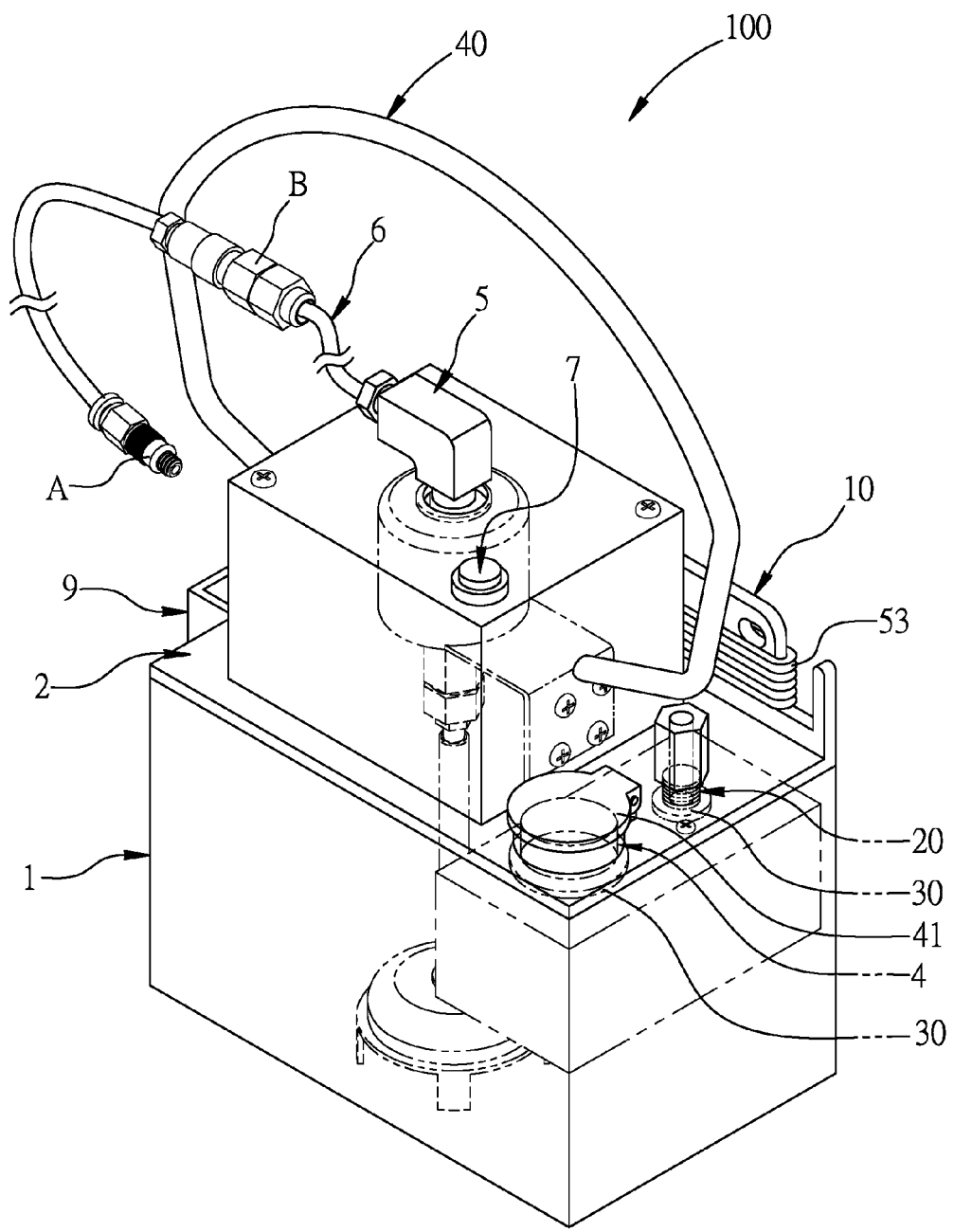
FIG. 4 is a perspective view of the automatic oil injector according to present invention.
Figure 5:
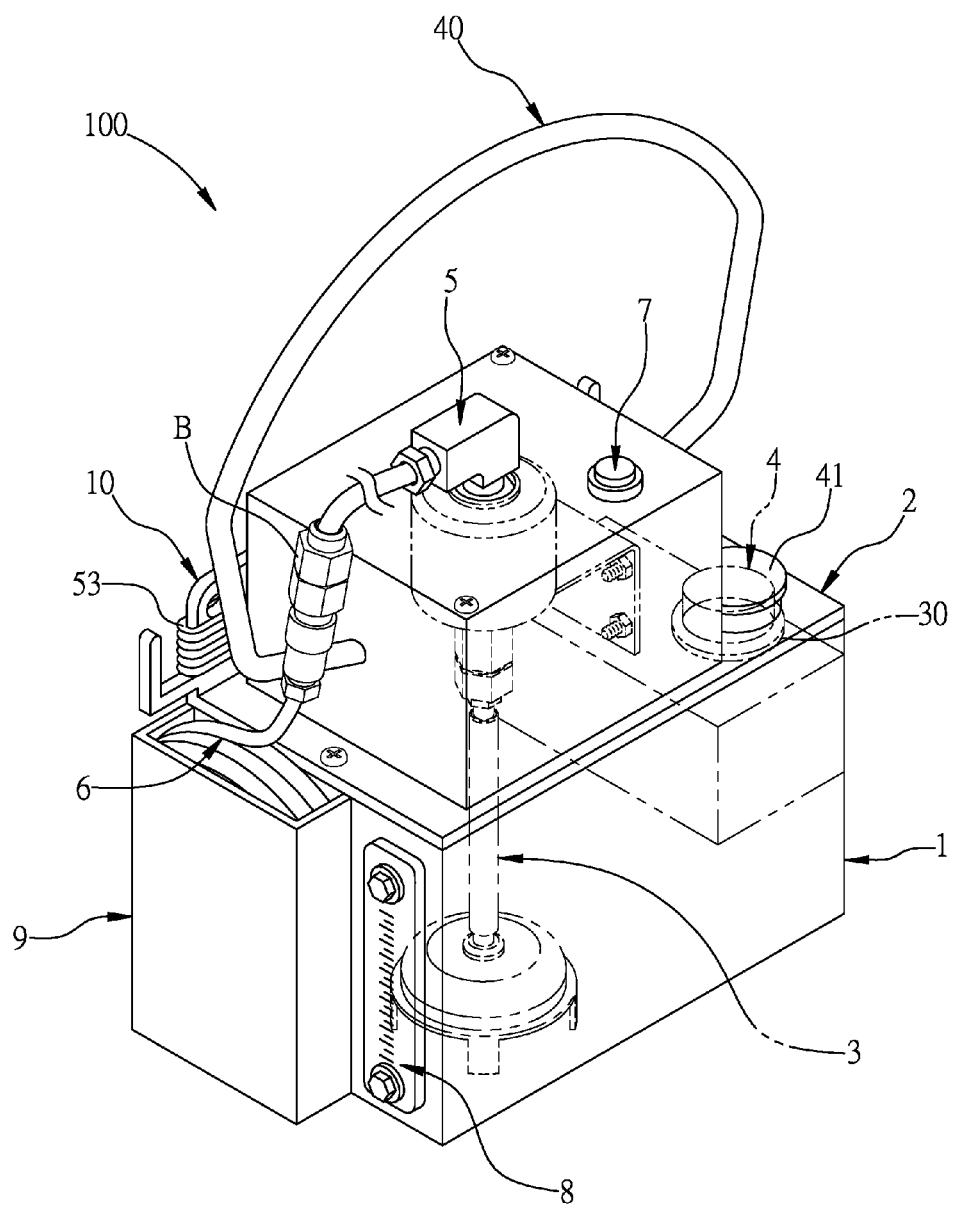
FIG. 5 is a schematic diagram of an electric wire of a pump winding around and receiving in an accommodating groove in FIG. 4.
Figure 6:
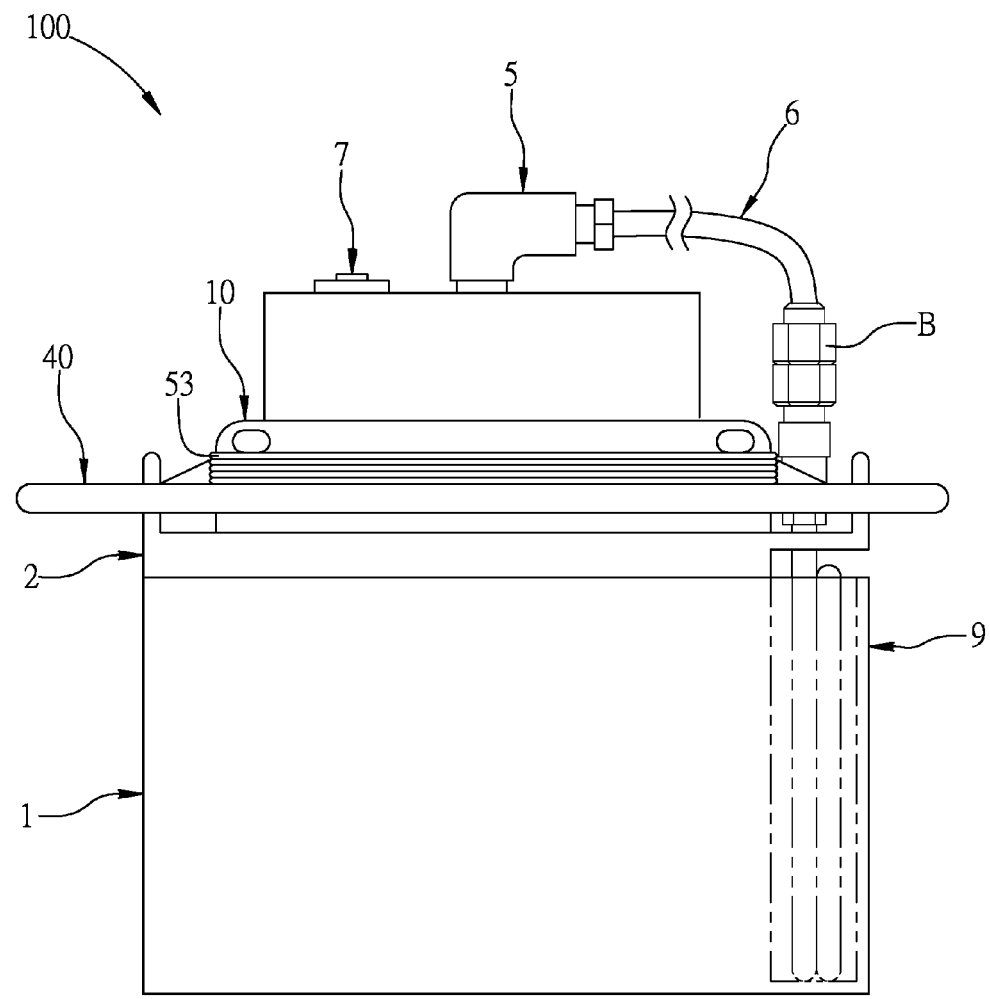
FIG. 6 is a rear and plane view of the automatic oil injector according to present invention.

FIG. 3 is an exploded view of an automatic oil injector according to present invention. FIG. 4 is a perspective view of the automatic oil injector according to present invention. FIG. 5 is a schematic diagram of an electric wire of a pump winding around and receiving in an accommodating groove in FIG. 4. FIG. 6 is a rear and plane view of the automatic oil injector according to present invention.

Please refer to FIG. 3 to FIG. 6, the automatic oil injector 100 comprises a container 1, a cover 2, a suction pipe 3, an inlet hole 4, a pump 5, an oil injecting pipe 6, a control switch 7, a liquid level indicator 8, and an accommodating groove 9.

The container 1 may have an open structure thereabove.

The cover 2 may be rectangular, but not limited thereto. The cover 2 may be detachably covering the container 1.

The suction pipe 3 may pass through and fastening to the cover 2, wherein one end of the suction pipe 3 is accommodated in the container 1 so as to contact an inner bottom surface of the container 1 and the other end of the suction pipe 3 is exposed externally to the cover 2 and the container 1.

The inlet hole 4 may be passing through the cover 2, wherein one end of the inlet hole 4 is fluidly communicated with the container 1 and the other end of the inlet hole 4 is disposing a folding cover 41.

The pump 5 may have an inlet port 51 and an outlet port 52. The end of the suction pipe 3 exposed externally to the cover 2 and the container 1 is fluidly connected with the inlet port 51 of the pump 5.

One end of the oil injecting pipe 6 may be fluidly connected with the outlet port 52 of the pump 5. The end of the oil injecting pipe 6 away from the outlet port 52 of the pump 5 may be fluidly connected to an oil hole of a bicycle (not shown) with at least one quick release structure A. With different sizes of the quick release structure, it is adapted to the sizes corresponding to different brands. And with the quick release structure, it is more convenient for users to assemble and disassemble it.

In addition, the oil injecting pipe 6 may be fluidly communicated with a check valve B for preventing the oil from being flowed back and preventing the air inflow from being kept in of the oil injecting pipe 6 in vacuum condition while stopping injecting oil.

The control switch 7 may be electrically connected to the pump 5 for controlling the operation of the pump 6. The control switch 7 may be a connecting switch. The power may be provided to the pump 5 by pressing the connecting switch (control switch 7) to operate the pump 5 continuously, and then the power may be stopped providing to the pump 5 by further pressing the connecting switch (control switch 7) to stop the pump 5.

The liquid level indicator 8 may be disposed outside the container 1 for indicating the level of oil accommodated in the container 1. The container 1 is filled with oil through the inlet hole 4 to the proper level as determined by the liquid level indicator 8. The oil is then driven by the pump 5 through the suction and oil injection pipes 3 and 6 and used to lubricate a device. Excess oil is then fed back into the container 1 from the device and enters the container 1 through the feedback hole 20.

The accommodating groove 9 may be connected to the container 1 for accommodating the oil injecting pipe 6.

The automatic oil injector 100 may further comprise a coil winding assembly 10 which is upwardly extending from a top surface of the container 1 for receiving an electric wire 53 of the pump 5 to be winded around.

Furthermore, the automatic oil injector 100 may further comprise a feedback hole 20 which passes through the cover 2 and spaced apart from the inlet hole 4. The feedback hole 20 may make the brake oil (not shown) feedback to container 1 after injecting oil. And it may prevent from wasting oil and make sure the oil is injected enough. In addition, two filters 30 are located in the container 1 and respectively covered the inlet hole 4 and the feedback hole 20 for filtering impurities while filling oil or feedbacking oil.

The automatic oil injector 100 may further comprise a handle 40 which is connected with the container 1 for carrying the automatic oil injector 100 easily.

While repairing, the oil injecting pipe 6 may be fluidly connected to an oil injecting hole (not shown) of a bicycle (not shown) and the pump 5 may be actuated by pressing the control switch 7, and then the oil in the container 1 may replace original oil in a brake container (not shown) of the bicycle through the suction pipe 3, pump 5, oil injecting pipe 6, the oil injecting hole of the bicycle (not shown) in series.

The liquid level indicator 8 may indicate the level of oil in the container 1, that is the level of oil means that the quantity of oil remains in the container 1.

When the oil in the container 1 is not enough, the folding cover 41 may be opened and new oil may be filled into the container 1 through the inlet hole 4.

While finishing repairing, the oil injecting pipe 6 may be surrounded and received in the accommodating groove 9 and the electric wire 53 of the pump 5 may be winded around the coil winding assembly 10 for receiving.

Therefore, based on above structure of the automatic oil injector 100 of this invention, it is not only easy to control the quantity of oil, but also easy to carry. And it has the efficiency of small volume, simplified structure, and preventing from influencing oil injecting quality operated by operators.

What is claimed is:
1. An automatic oil injector, comprising:
a container having an open structure thereabove;
a cover detachably covering the container;
a suction pipe passing through and fastening to the cover, wherein one end of the suction pipe is accommodated in the container so as to contact an inner bottom surface of the container and the other end of the suction pipe is exposed externally to the cover and the container;
an inlet hole passing through the cover, wherein one end of the inlet hole is fluidly communicated with the container and the other end of the inlet hole is disposing a folding cover;
a pump having an inlet port and an outlet port, the end of the suction pipe exposed externally to the cover and the container is fluidly connected with the inlet port of the pump;
an oil injecting pipe, wherein one end of the oil injecting pipe is fluidly connected with the outlet port of the pump;
a control switch electrically connected to the pump for controlling the operation of the pump;
a liquid level indicator disposed externally to the container for indicating the level of oil accommodated in the container;
an accommodating groove connected to the container for accommodating the oil injecting pipe;
a feedback hole passing through the cover and spaced apart from the inlet hole;
two filters located in the container and respectively cover the inlet hole and the feedback hole; and
wherein the container is filled with oil through the inlet hole to the proper level as determined by the liquid level indicator, the oil is then driven by the pump through the suction and oil injection pipes and used to lubricate a device, excess oil is then fed back into the container from the device and enters the container through the feedback hole.

2. The automatic oil injector claimed as claim 1, further comprising a coil winding assembly, upwardly extending from a top surface of the container for receiving an electric wire of the pump to be winded around.

3. The automatic oil injector claimed as claim 1, further comprising a handle, connected with the container.

4. The automatic oil injector claimed as claim 1, wherein the oil injecting pipe is fluidly communicated with a check valve.

* * * * *